(12) United States Patent
Happy (10) Patent No.: US 10,995,924 B2
(45) Date of Patent: May 4, 2021

(54) HEADLIGHT LENS ASSEMBLY

(71) Applicant: Nissan North America, Inc., Franklin, TN (US)

(72) Inventor: Kyle Happy, Walled Lake, MS (US)

(73) Assignee: NISSAN NORTH AMERICA, INC., Franklin, TN (US)

(*) Notice: Subject to any disclaimer, the term of this patent is extended or adjusted under 35 U.S.C. 154(b) by 0 days.

(21) Appl. No.: 16/048,719

(22) Filed: Jul. 30, 2018

(65) Prior Publication Data

US 2020/0032974 A1 Jan. 30, 2020

(51) Int. Cl.
| | |
|---|---|
| *F21V 5/00* | (2018.01) |
| *F21S 41/25* | (2018.01) |
| *F21S 45/47* | (2018.01) |
| *B29D 11/00* | (2006.01) |
| *F21S 41/29* | (2018.01) |

(52) U.S. Cl.
CPC ........ *F21S 41/25* (2018.01); *B29D 11/00009* (2013.01); *F21S 41/295* (2018.01); *F21S 45/47* (2018.01); *B29K 2995/0025* (2013.01); *B29K 2995/0026* (2013.01)

(58) Field of Classification Search
CPC .......... F21S 41/25; F21S 41/295; F21S 45/47; B29D 11/00009; B29K 2995/0025; B29K 2995/002
USPC ....................................................... 362/520
See application file for complete search history.

(56) References Cited

U.S. PATENT DOCUMENTS

| | | | | |
|---|---|---|---|---|
| 1,348,618 A | * | 8/1920 | Zorger | F21S 41/28 362/309 |
| 5,211,465 A | | 5/1993 | Suzuki | |
| 6,017,141 A | * | 1/2000 | Sugiyama | B29C 65/0618 362/520 |
| 6,811,285 B2 | * | 11/2004 | Ferguson | F21S 48/1208 362/267 |
| 2006/0068206 A1 | * | 3/2006 | Hala | B29C 45/0013 428/411.1 |
| 2007/0133220 A1 | * | 6/2007 | Watanabe | B29C 65/7814 362/538 |
| 2013/0148363 A1 | * | 6/2013 | Choquet | B29C 45/16 362/311.02 |
| 2015/0306838 A1 | * | 10/2015 | Ito | B32B 3/04 428/189 |

FOREIGN PATENT DOCUMENTS

| | | | | |
|---|---|---|---|---|
| JP | 2003025377 A | * | 1/2003 | |
| JP | 2017-061063 A | | 3/2017 | |

OTHER PUBLICATIONS

Espacenet English translation of reference JP-2003025377-A (Year: 2003).*

* cited by examiner

*Primary Examiner* — William J Carter
*Assistant Examiner* — Omar Rojas Cadima
(74) *Attorney, Agent, or Firm* — Global IP Counselors, LLP (57) ABSTRACT

A headlight lens assembly includes a projector lens portion and an outer portion. The projector lens portion is configured to couple to a projector, and is formed by a multi-step molding process. The outer portion is formed as one piece with the projector lens portion during at least one step of the multi-step molding process.

16 Claims, 8 Drawing Sheets

HEADLIGHT LENS ASSEMBLY

BACKGROUND

Field of the Invention

The present invention generally relates to a headlight lens assembly. More specifically, the present invention relates to a headlight lens assembly with the projector lens integrated with the outer lens.

Background Information

Conventional headlights include a projector and an outer lens. In these types of headlights, the projector lens is disposed internally of and spaced from the outer lens.

SUMMARY

It has been discovered that by improving the manufacturing procedure, resultant projected light is increased. That is, by integrating the projector lens with the outer lens, light losses associated with traveling through a separate outer lens can be reduced or eliminated. These light losses are typically between 10% and 13% of light output.

In view of the state of the known technology, one aspect of the present disclosure is to provide a headlight lens assembly comprising a projector lens portion and an outer portion. The projector lens portion is configured to couple to a projector, and is formed by a multi-step molding process. The outer portion is formed as one piece with the projector lens portion during at least one step of the multi-step molding process.

Another aspect of the present disclosure is to provide a multistep molding method to form a headlight lens assembly, the method comprising molding, in at least a first step, a projector lens portion configured to couple to a projector, and molding, in another step, an outer portion so as to be one piece with the projector lens portion.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
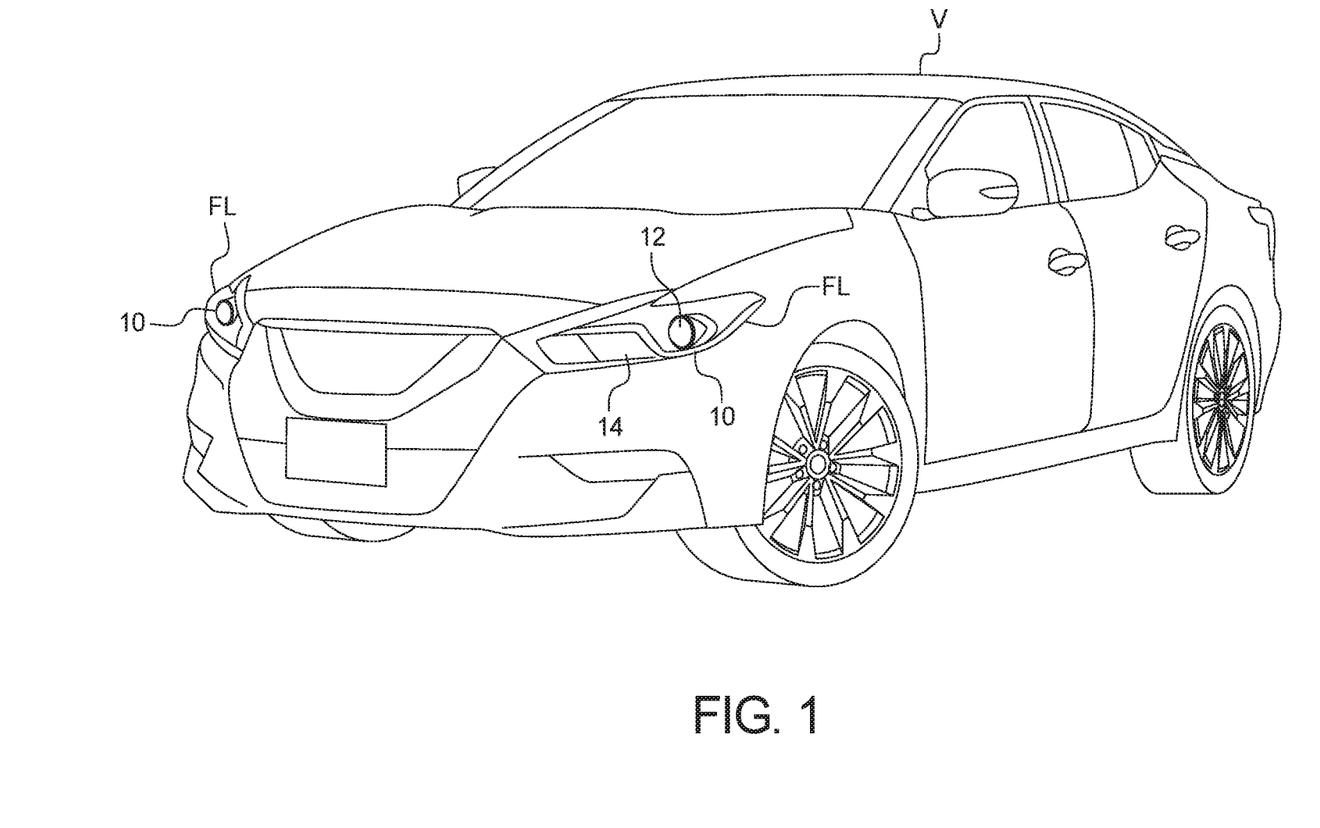
FIG. 1 illustrates a vehicle with the head light lens assembly according to an embodiment of the present invention.
Figure 2:
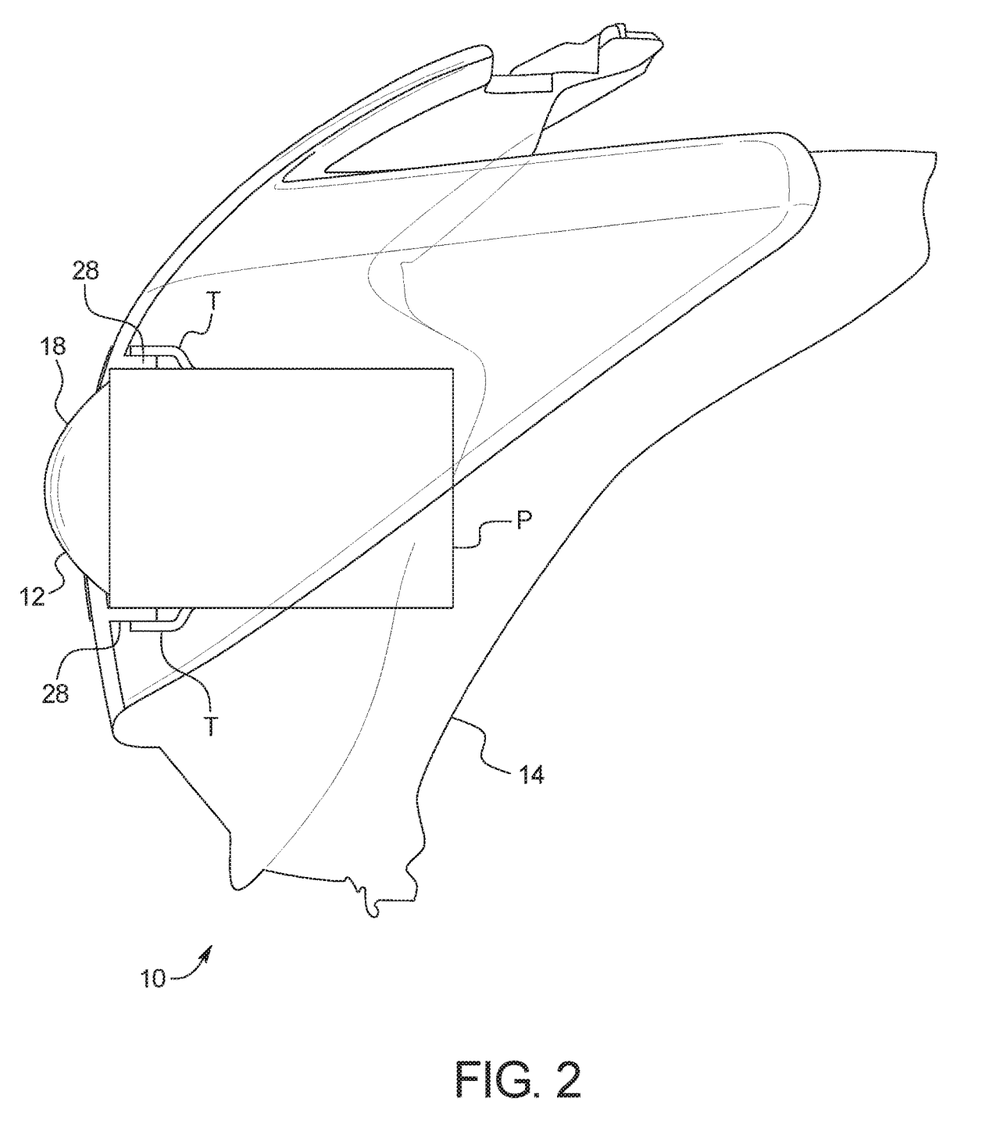
FIG. 2 is a side view of the headlight lens assembly of FIG. 1.
Figure 3:
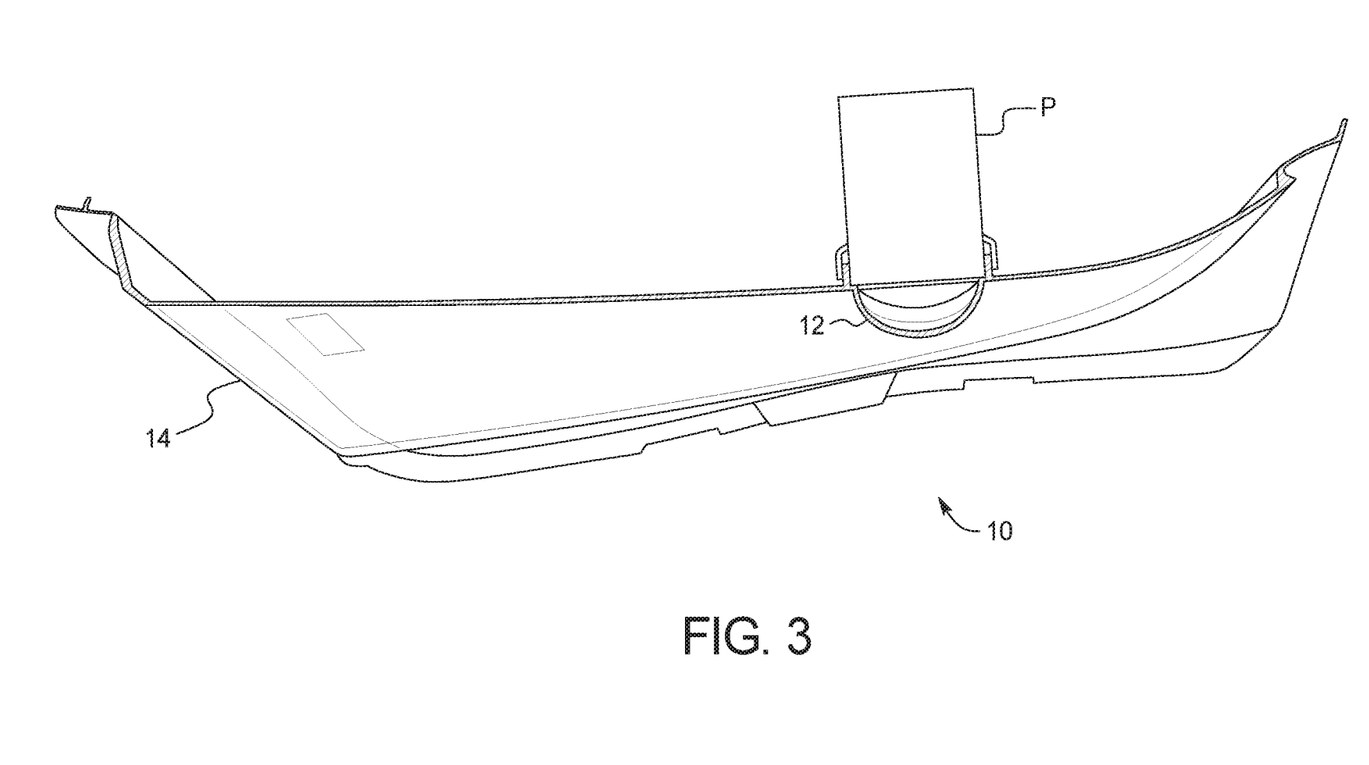
FIG. 3 is a top view of the headlight lens assembly of FIG. 1.

Referring initially to FIG. 1, a headlight lens assembly 10 is illustrated in accordance with a first embodiment. The headlight lens assembly 10 can be the front lights FL of a vehicle V. However, the headlight lens assembly 10 can be any light assembly for any suitable vehicle.

As shown in FIGS. 2-6 the headlight lens assembly 10 can include a projector lens portion 12 and an outer lens portion (outer portion) 14. The projector lens portion 12 is configured to couple to a projector P, and is formed by a multi-step molding process. The outer lens portion 14 is formed as one piece with the projector lens portion 12 during at least one step of the multi-step molding process.

The projector P includes a housing H that is substantially cylindrical. As can be understood, the projector P uses a lamp L and a reflector R to direct light outwardly to improve nighttime vehicle V operation and/or third party observance of the vehicle V. The projector P can include projections or tabs T on the outside surface of the housing H for connection to the lens assembly.

The lens assembly 10 can be formed by a multi-step molding process (or multi-shot injection molding). Preferably the lens assembly 10 is formed from a transparent plastic material, but the material can be any suitable material and can be transparent or translucent, opaque or combination thereof. In multi-shot injection molding, multiple layers are formed relative to the starting axis of the initial mold. In other words, heated materials are inserted into the mold in a predetermined sequence one after another. This creates a layering effect between materials while maintaining relatively high-energy interactions at material boundaries.

Thus, in one embodiment, the projector lens portion 12 is first formed through one or more injection molding steps. Preferably the projector lens portion 12 is formed from a transparent plastic material, or any suitable material. As can be understood, the multi-step molding process forms multiple layers of the lens through a plurality of steps. First, the mold is configured to form a first layer 16 (FIG. 7) of the projector lens portion 12. The first layer 16 is preferably approximately or about 1-2 mm thick. A first portion of the mold can then be turned (for example 90 degrees) or reoriented relative a second portion of the mold and a second layer (not shown) of the projector lens portion 12 can be formed. Such a process can be performed any number of suitable times until the projector lens portion 12 is formed. As can be understood, each time a layer of the projector lens portion 12 is formed a first portion of the mold is turned or reoriented relative the second portion of the mold. This reorientation causes the molds to form a larger cavity (or reconfigured cavity) therebetween so as to form the second layer of the projector lens portion 12. Each layer of the lens portion 12 can be 1-2 mm think or any suitable thickness.

Figure 7:
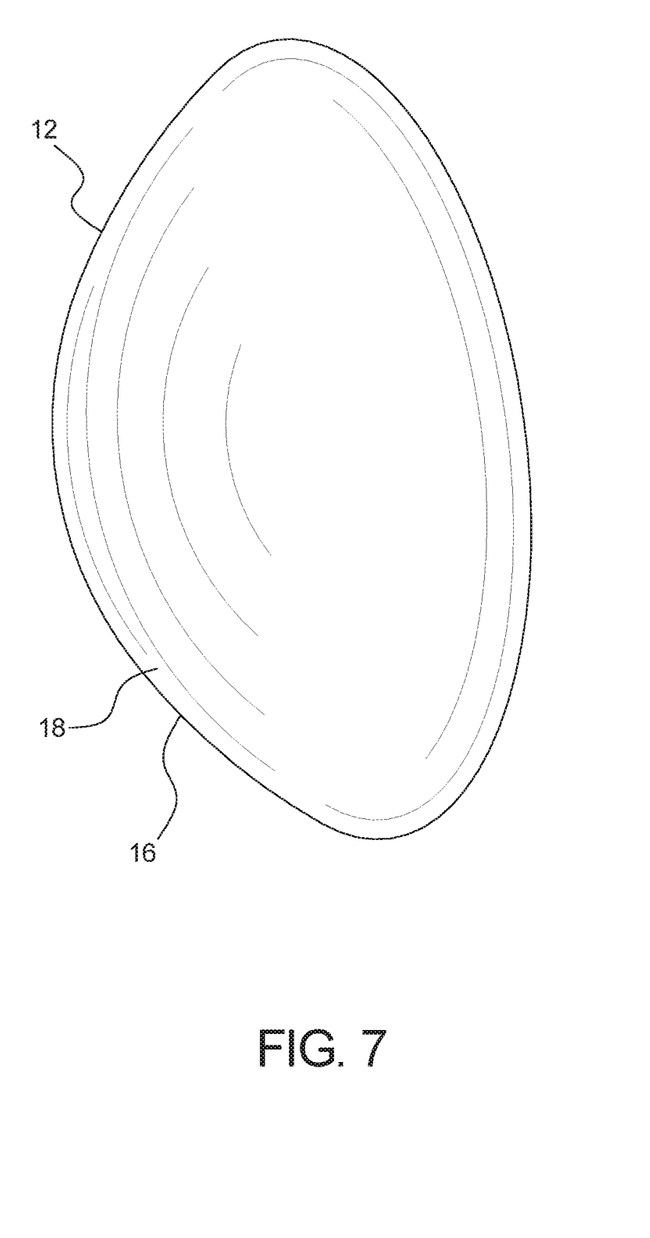
FIG. 7 is one stage of the molding process when forming the headlight lens assembly of FIG. 1.

As shown in FIG. 7, the projector lens portion 12 is generally complete after a predetermined number of injection steps (e.g., between 1 and 10). In this embodiment, the projector lens portion 12 is completed after a single layer 16; however, as stated above the projector lens portion 12 can be formed after 2 or more injection steps. The projector lens portion 12 is preferably generally circular with a convex side 18 and a concave side 20. However, the projector lens portion 12 can be any suitable shape to enable light from the projector P to pass therethrough and improve visibility for the occupants of the vehicle V and/or enable outside or third parties improved identification of the vehicle V.

Once the projector lens portion 12 is completed the first portion of the mold is turned or reoriented relative the second portion of the mold while the projector lens portion 12 is still disposed in the mold to enable the mold to form the final mold step. In the final mold step, the outer lens portion 14 is formed. Since the projector lens portion 12 is still disposed within the mold the outer lens portion 14 is overmolded onto the projector lens portion 12.

Accordingly, the outer lens portion 14 is formed as a one-piece integral member with the projector lens portion 12 through the molding process. The outer lens portion can be any suitable material. In one embodiment, the outer lens portion is the same material as the projector lens portion and is transparent. However, it is noted that the outer lens portion can be a different material or a similar material and be translucent or opaque. The outer lens portion 14 can be any desired thickness, for example, 1-3 mm thick and form any suitable shape. As shown in FIG. 1, the outer lens portion 14 has an elongated shape with a top projection 22. The shape disclosed herein is merely exemplary and the outer lens portion 14 can be any suitable shape.

Figure 4:
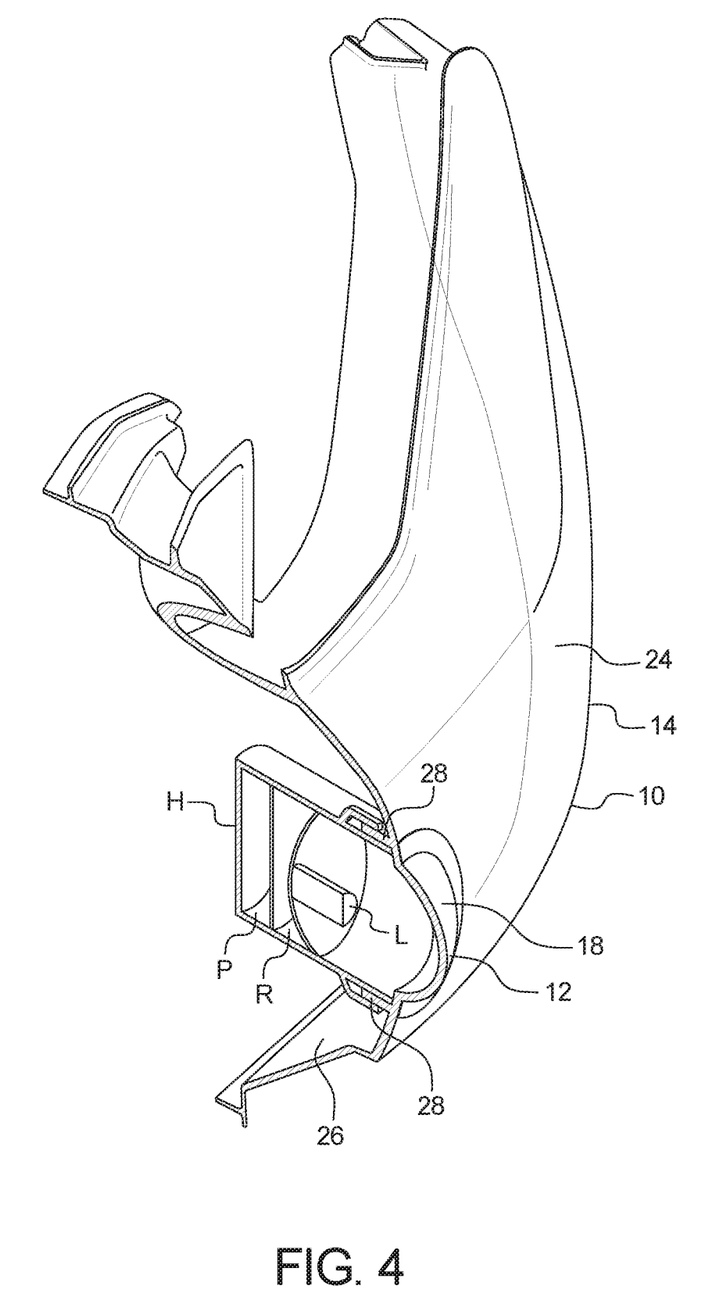
FIG. 4 is a perspective cross sectional view of the headlight lens assembly of FIG. 1.
Figure 5:
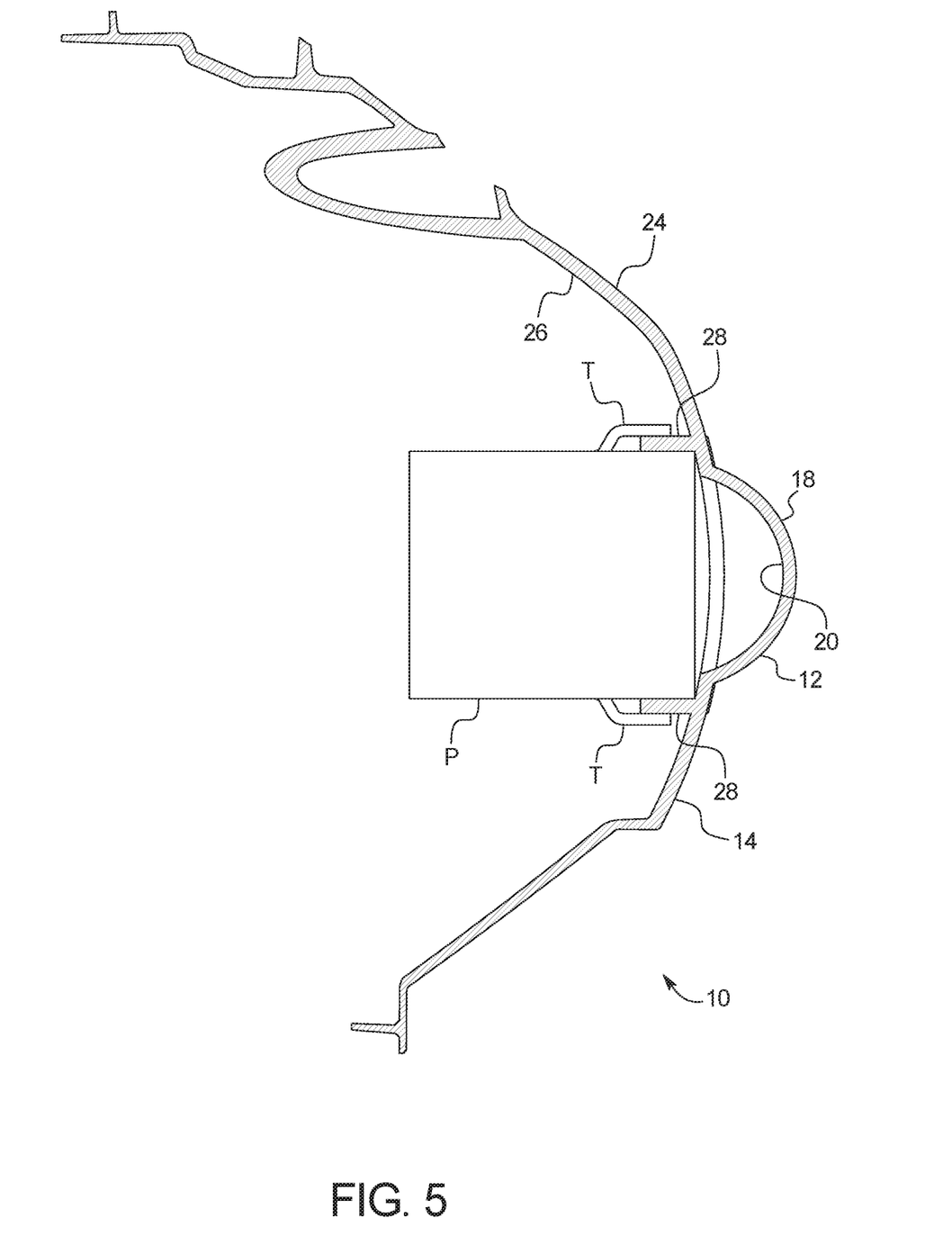
FIG. 5 is a cross sectional view of the headlight lens assembly of FIG. 1.
Figure 8:
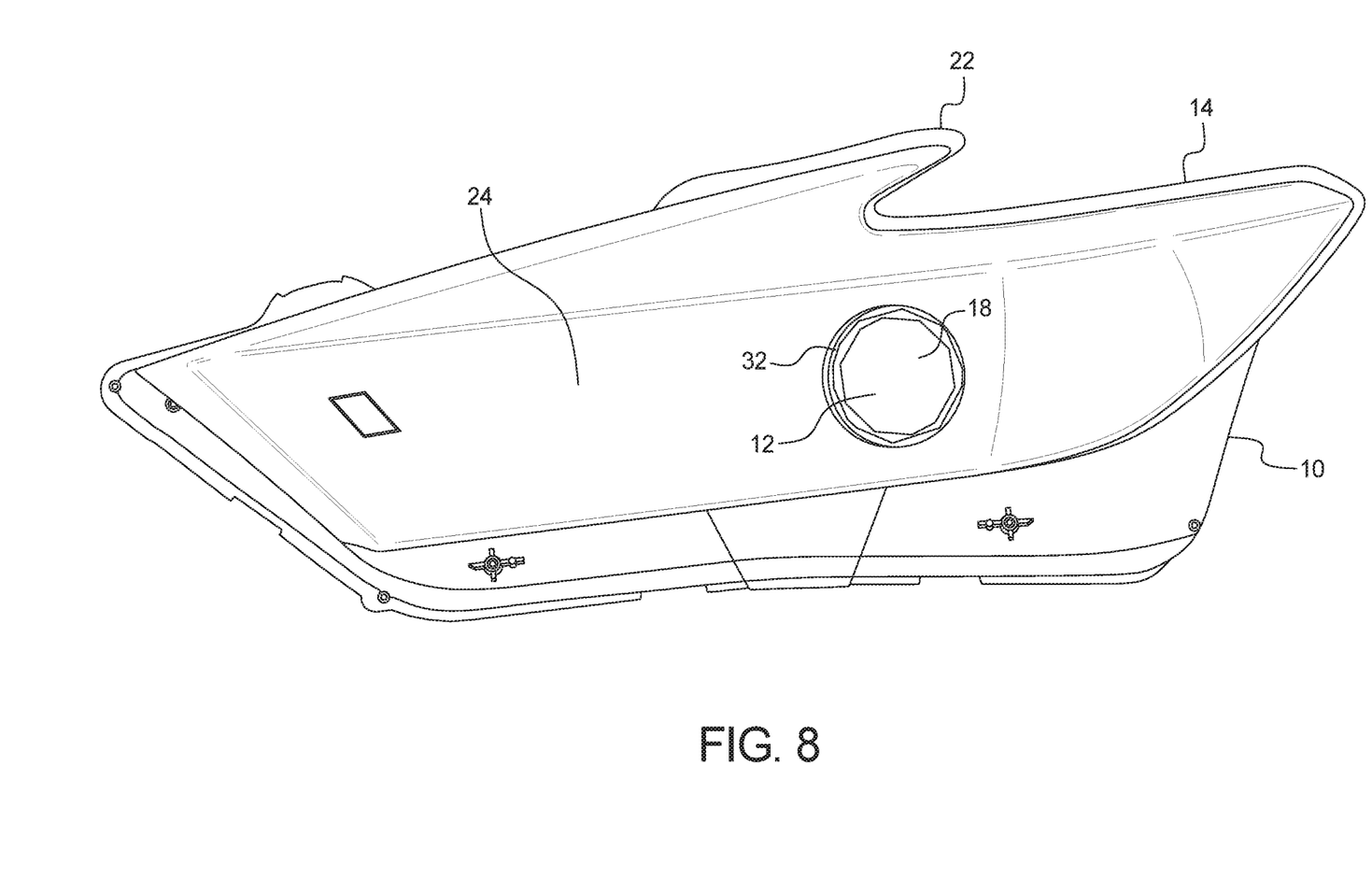
FIG. 8 is the final stage of the molding process when forming the headlight lens assembly of FIG. 1.

As shown in FIGS. 4, 5 and 8, the projector lens portion 12 is disposed generally in a central location of the outer lens portion 14 and the convex portion 18 protrudes beyond the outer surface of the outer lens portion 14. In one embodiment, the projector lens portion 12 can be disposed within the outer lens portion 14, such that the apex of the convex portion 18 is flush with the outer surface 24 of the outer lens portion 14 and the remainder of the projector lens portion 12 is disposed adjacent to the inner surface 26 of the outer lens portion 14.

It is noted that any amount of the projector lens portion 12 be disposed so as to project from the outer surface 24 of the outer lens portion 14. Moreover, the projector lens portion 12 can have any suitable concave configuration such that some, none or all of the concave portion 18 is disposed to protrude through the outer surface 24 of the outer lens portion 14.

The inner surface 26 of the outer lens portion 14 includes connectors or fasteners 28 that enable the projector P to couple thereto. In one embodiment, the fasteners are heat stakes that enable the projector P to be permanently or semi-permanently connected to the projector P. However, it is noted that the projector P can be coupled to the outer lens portion 14 and/or the projector lens portion 12 in any suitable manner.

Figure 6:
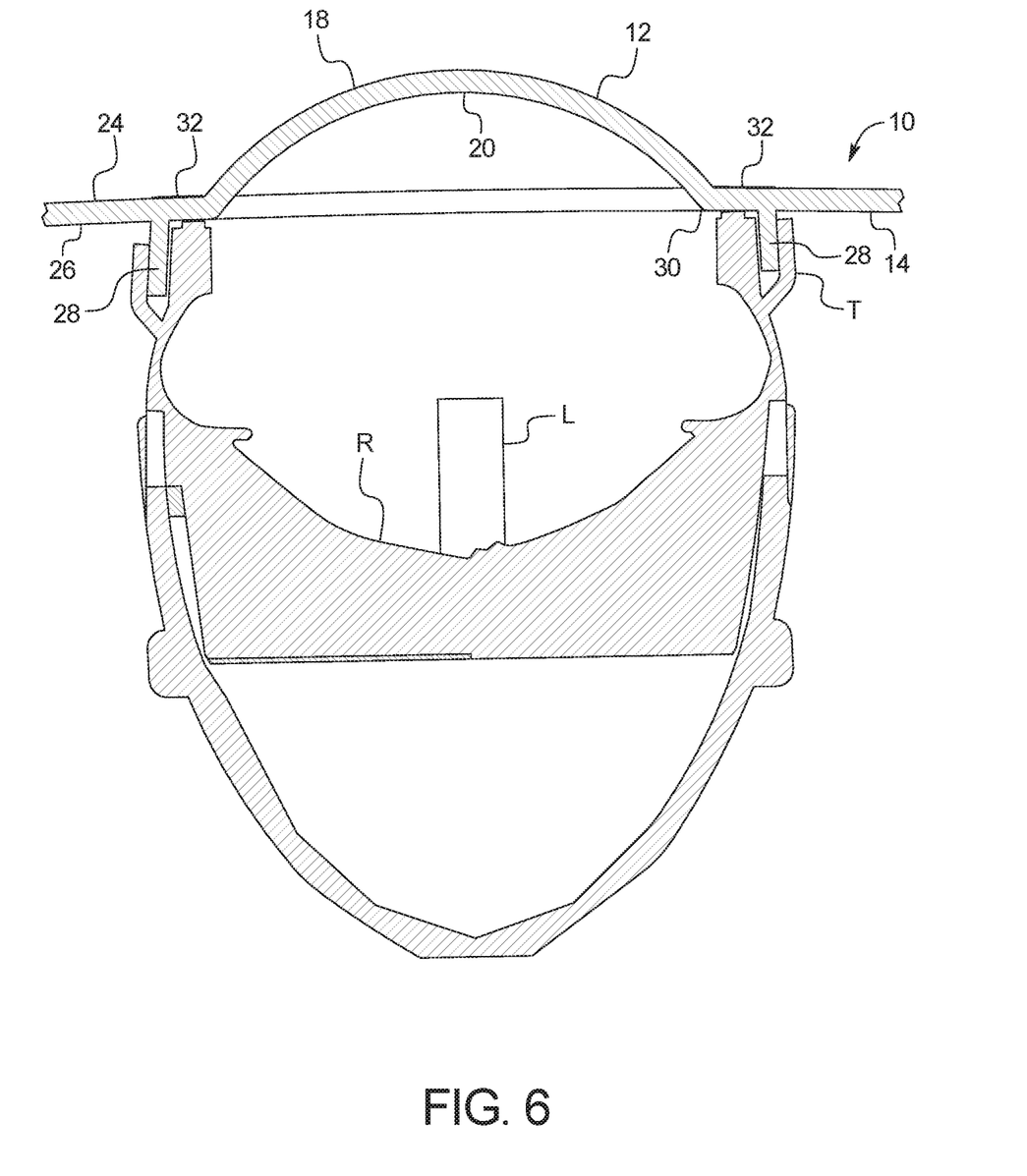
FIG. 6 is an enlarged view of the projector and projector lens portion of the headlight lens assembly of FIG. 5.

Thus, as shown in FIG. 6, the projector P is coupled to the inner surface 26 of the outer lens portion 14 such the projector P forms a tight fit with and abuts against the perimeter of the projector lens portion 12. That is the housing of the projector P has a diameter that is substantially the same as the diameter of the perimeter of the projector lens portion 12.

Additionally, as shown in FIGS. 6 and 8, the lens assembly can have an opaque portion 32 at the outer perimeter 30 of the projector lens portion 12. This opaque portion 32 can be painted on or formed in any suitable manner. The opaque portion 32 can be a formed to obscure the projector P beneath the lens assembly.

By integrating the projector lens portion 12 and the outer lens portion 14, light losses associated with traveling through the separate outer lens can be eliminated. These light loses are typically between 10% and 13% of the light output.

The projector P is a conventional component that is well known in the art. Since the projector P is well known in the art, this structure will not be discussed or illustrated in detail herein. Rather, it will be apparent to those skilled in the art from this disclosure that the component can be any type of structure that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the headlight lens assembly 10. Accordingly, these terms, as utilized to describe the present invention should be interpreted relative to a vehicle equipped with the headlight lens assembly 10.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A headlight lens assembly, comprising:
a projector lens portion configured to be disposed adjacent to a projector, and being formed by a multi-step molding process to form multiple layers of the projector lens portion, the projector lens portion including an outer convex side and an inner concave side; and an outer portion formed as one piece with the projector lens portion during an additional step of the multi-step molding process, the outer portion being at least partially transparent and including an inner surface and connectors disposed on the inner surface, the connectors configured to couple to the projector to enable the projector to be positioned adjacent the projector lens portion, the inner concave side of the projector lens portion having a radius of curvature that defines a hollow interior area that opens at the inner surface of the outer portion, and the radius of curvature of the inner concave side of the projector lens portion being different from a radius of curvature of the inner surface of the outer portion such that the projector lens portion is generally circular and least partially protrudes from a surface of the outer portion.

2. The headlight lens assembly according to claim 1, wherein the projector lens portion and the outer portion are completely transparent.

3. The headlight lens assembly according to claim 1, wherein the projector lens portion at least partially protrudes from a surface of the outer portion.

4. The headlight lens assembly according to claim 1, wherein the projector lens portion is convex.

5. The headlight lens assembly according to claim 1, further comprising the connector is a fastener configured to couple to the projector.

6. The headlight lens assembly according to claim 5, wherein the fastener is a heat stake.

7. The headlight lens assembly according to claim 1, wherein the projector lens portion includes an opaque portion at an outer perimeter thereof.

8. A multistep molding method to form a headlight lens assembly, the method comprising:

molding, in at least a first step and a second step, a projector lens portion having multiple layers configured to be positioned adjacent to a projector, and having an outer convex side and an inner concave side; and molding, in another step, an outer portion so as to be one piece with the projector lens portion, the outer portion being at least partially transparent including an inner surface and connectors disposed on the inner surface, the connectors configured to couple to the projector to enable the projector to be positioned adjacent the projector lens portion, the inner concave side of the projector lens portion having a radius of curvature that defines a hollow interior area that opens at the inner surface of the outer portion.

9. The method according to claim 8, wherein the projector lens portion and the outer portion are completely transparent.

10. The method according to claim 8, wherein the molding of the outer portion includes molding the outer portion such that the projector lens portion at least partially protrudes from a surface of the outer portion.

11. The method according to claim 8, wherein the molding of the projector lens portion includes molding the projector lens portion to be convex.

12. The method according to claim 8, wherein the connector is a fastener configured to couple to the projector.

13. The method according to claim 12, wherein the fastener is a heat stake.

14. The method according to claim 8, wherein the another step is a final step in the method.

15. The method according to claim 8, further comprising forming an opaque portion on the projector lens portion at an outer perimeter thereof.

16. The method according to claim 8, wherein the radius of curvature of the inner concave side of the projector lens portion is different from a radius of curvature of the inner surface of the outer portion such that the projector lens portion is generally circular and least partially protrudes from a surface of the outer portion.

* * * * *